Figure 7:
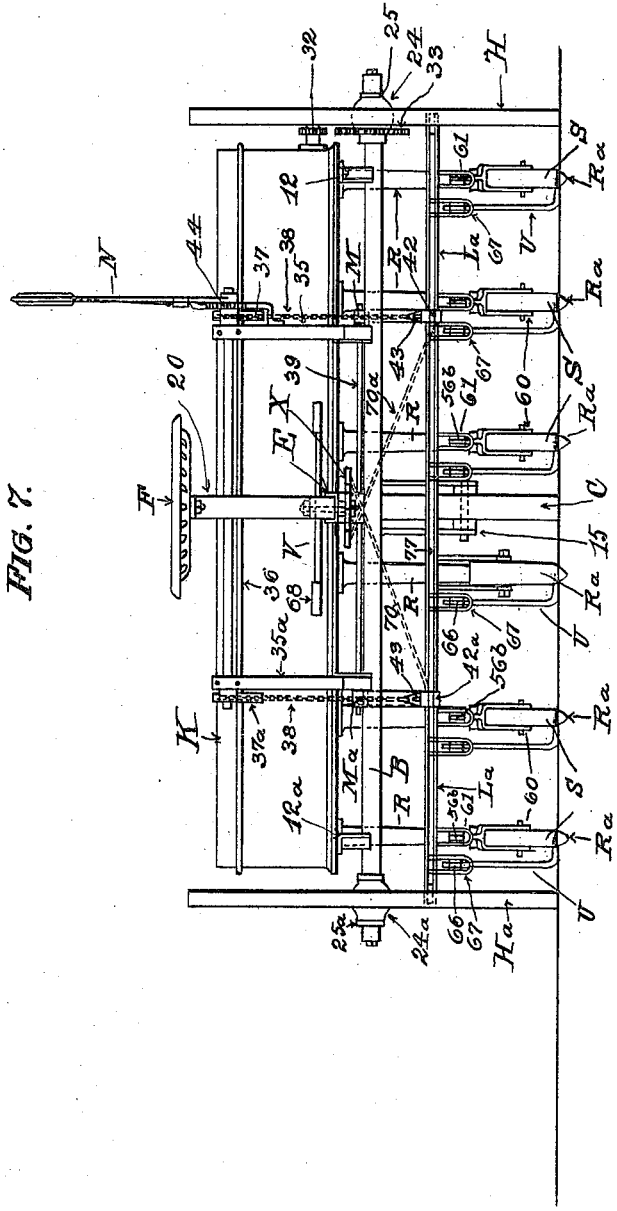

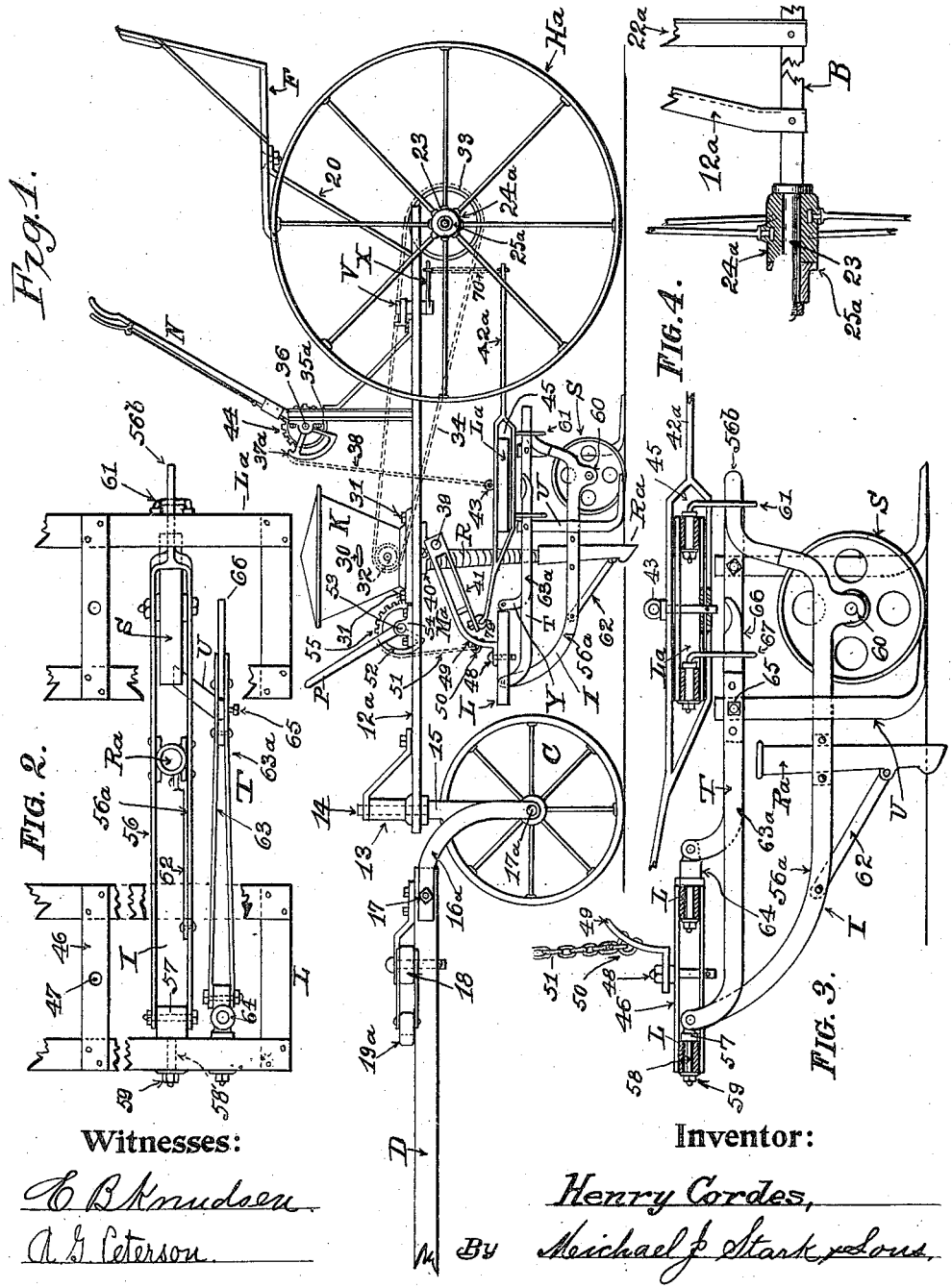

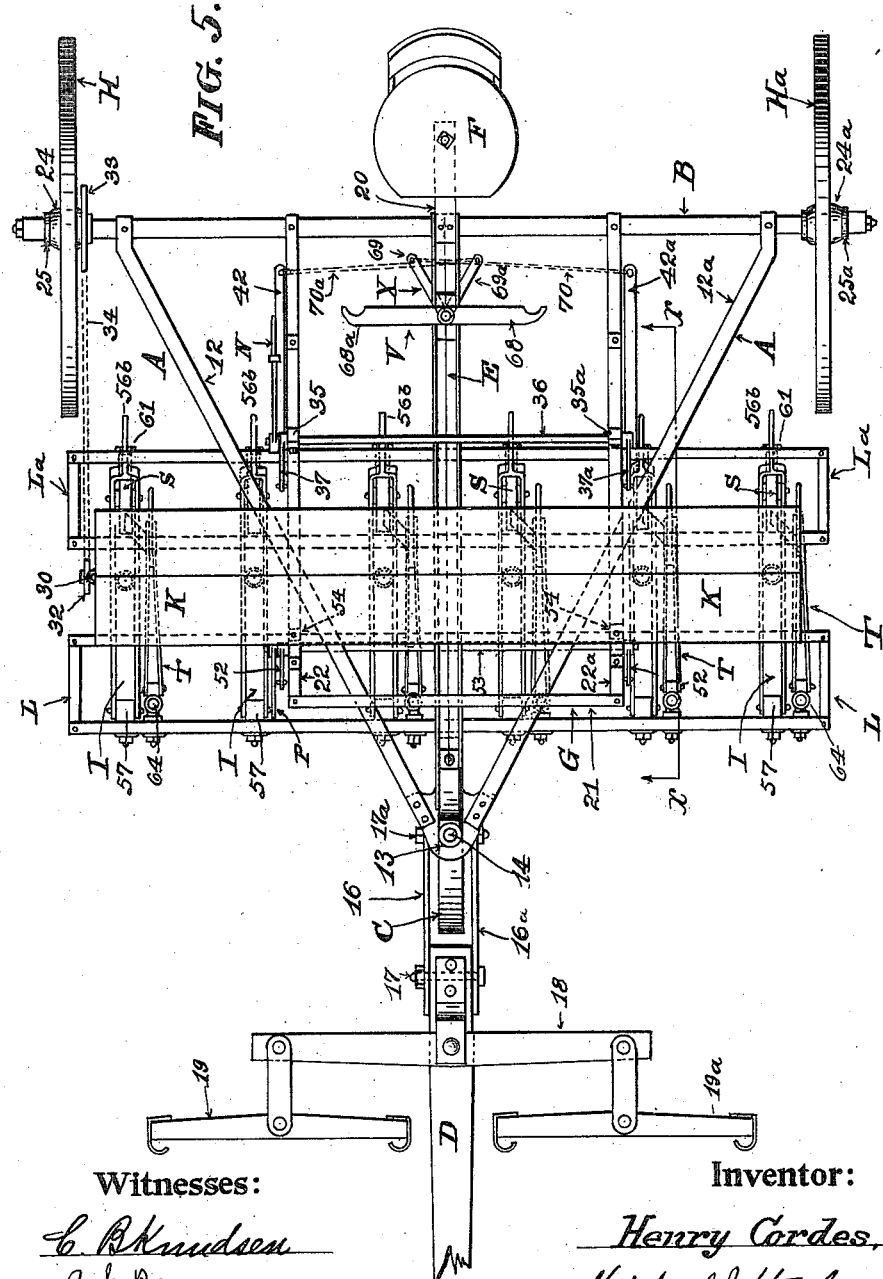

H. CORDES.
COMBINED SEEDING AND CULTIVATING MACHINE.
APPLICATION FILED SEPT. 16, 1910.
985,570.
Patented Feb. 28, 1911.
5 SHEETS—SHEET 3.
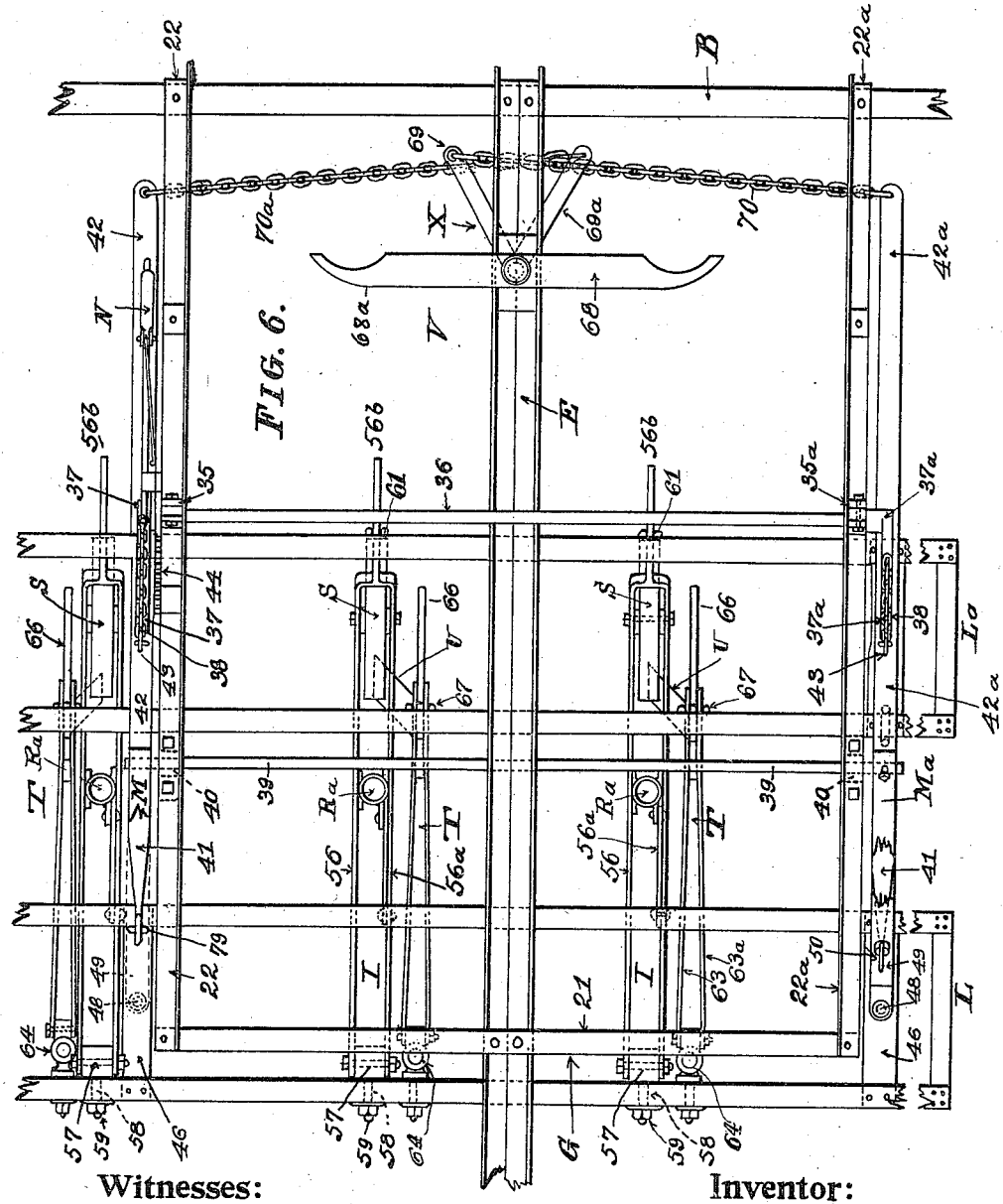
Witnesses:
E. B. Knudsen
A. G. Peterson.
Inventor:
Henry Cordes,
By Michael Stark & Sons,
Attorneys.

H. CORDES.
COMBINED SEEDING AND CULTIVATING MACHINE.
APPLICATION FILED SEPT. 16, 1910.

985,570.

Patented Feb. 28, 1911.
5 SHEETS—SHEET 4.

Witnesses:
C. B. Knudsen.
A. G. Peterson.

Inventor:
Henry Cordes.
By Michael J. Stark & Sons,
Attorneys.

H. CORDES.
COMBINED SEEDING AND CULTIVATING MACHINE.
APPLICATION FILED SEPT. 16, 1910.
985,570.
Patented Feb. 28, 1911.
5 SHEETS—SHEET 5.
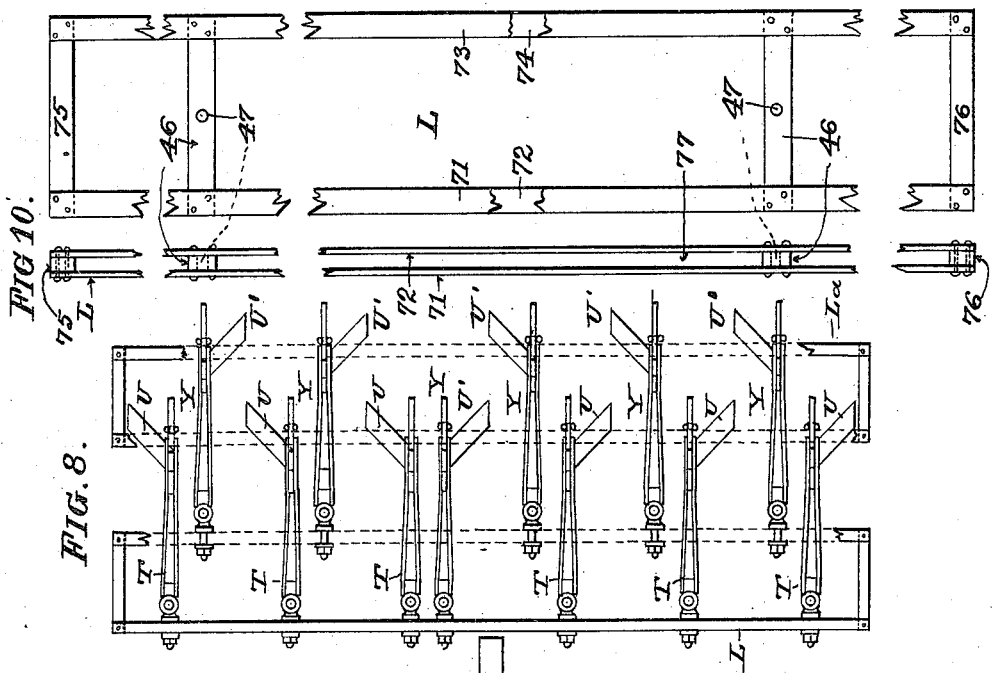
Witnesses:
C. B. Knudsen
A. G. Peterson
Inventor:
Henry Cordes,
By Michael J. Stark & Sons,
Attorneys.

UNITED STATES PATENT OFFICE.

HENRY CORDES, OF DENVER, COLORADO.

COMBINED SEEDING AND CULTIVATING MACHINE.

985,570.

Specification of Letters Patent.  Patented Feb. 28, 1911.

Application filed September 16, 1910.  Serial No. 582,333.

*To all whom it may concern:*

Be it known that I, HENRY CORDES, a citizen of the United States, and temporarily residing at Denver, in the county of Denver and State of Colorado, have invented certain new and useful Improvements in a Combined Seeding and Cultivating Machine; and I do hereby declare that the following description of my said invention, taken in connection with the accompanying sheets of drawings, forms a full, clear, and exact specification, which will enable others skilled in the art to which it appertains to make and use the same.

This invention has general reference to a combined seeding and cultivating machine; and it consists, essentially, in the novel and peculiar combination of parts and details of construction, as hereinafter first fully set forth and described and then pointed out in the claims.

In the drawings already referred to, which serve to illustrate this invention more fully, and form a part of this specification, Figure 1 is a side elevation of my combined seeding and cultivating machine. Fig. 2 is a plan of a fragment of one of the subframes showing one of the seeder pipe and pressure wheel holders. Fig. 3 is a sectional elevation of the subframe taken on line $x$ $x$ of Fig. 5. Fig. 4 is a plan of a portion of the main axle and showing a portion of the wheel in section. Fig. 5 is a plan of the complete machine. Fig. 6 is a plan of the medial portion of the machine, the seed box and portions of the main frame being removed to disclose underlying parts, the figure being drawn on an increased scale. Fig. 7 is a rear elevation. Fig. 8 is a plan of the two subframes with the cultivator knives in position. Fig. 9 is a plan of the two subframes detached and in relative parallel position, and Fig. 10 is a side view of one of the frames.

Like parts are designated by corresponding symbols and characters of reference in all the various figures.

The object of this invention is the production of an efficient, serviceable and durable combined seeder and cultivator, which although especially effective in the cultivation of sugar beets, is well adapted for general use.

It comprises a main frame mounted on two rear, and preferably one forward wheel; two auxiliary frames below said main frame, in which the seeder pipe holders and pipes and the pressure wheels as well as the cultivator knife-holders and knives are pivoted; means for elevating and lowering these auxiliary frames; means for propelling the machine and steering the same, and means independent of the propelling means for steering the device to accurately follow the marking line and the rows of plants, there being upon said main frame a seed box, removably secured to said frame, and suitable mechanism for dropping the seed into the seed pipes.

In the drawings the reference symbol A designates a part of the main frame. It is a triangular structure formed of two converging side members 12, $12^a$, made by preference from angle iron, and having their rear ends secured to the main axle B, their other ends being secured to a tubular head piece 13, in the bore of which is located the shank 14, of the fork 15, in which there is journaled the forward wheel C, by a pivot bolt $17^a$. This fork has two forwardly extending side-members 16 $16^a$, between which is pivotally secured a pole D, by a bolt 17, there being upon said pole C the usual swingle-trees 19, $19^a$ and the double tree 18, to which a team of draft-animals is hitched in the usual manner to propel the machine.

Centrally in the triangular frame A there is a longitudinally disposed bar E, comprising, preferably, two angle bars located side by side, the rear ends of which are secured to the rear axle B, and the forward ends of which are fastened to the tubular head piece 13, which has, for this purpose a surrounding flange, as shown in the drawings. Upon this compound bar E, and near the rear end thereof, there is fastened a spring-bar 20, the upper end of which carries the seat F, upon which the driver of the team is seated.

Upon the triangular frame A there is located a rectangular frame G, comprising a forward transverse bar 21, and two side-bars, 22, $22^a$, the rear ends of which are fastened to the rear axle B. These frame members A, E, and G, in connection with the rear axle B constitute the main frame, the members of which are securely fastened together in an approved manner.

Upon the spindles 23 of the main axle B are mounted the rear wheels H, $H^a$, which have in front of their hubs 24, 24ᵃ, sleeves 25, 25ᵃ, which are constructed to retain the rear wheels H, Hᵃ, upon their respective spindles.

The seed box K is removably fastened upon the side members 22, 22ᵃ, of the rectangular frame G, by screws 31, Fig. 1, and it contains the usual dropper mechanism, not shown, which is rotated by a driven sprocket wheel 32, receiving its motion from a driver sprocket wheel 33, fastened to the rear wheel H, by a link-belt 34, indicated in Fig. 1, by dotted lines.

Below the main frame there are located, transversely to the same, two rectangular auxiliary frames L, Lᵃ, which frames are suspended below said main frame in the following manner: Upon the side members 22, 22ᵃ, of the rectangular frame G and approximately in the middle thereof, are secured two upwardly projecting posts 35, 35ᵃ, having at their upper ends bearings in which there is journaled a shaft 36, carrying at its ends segmental arms 37, 37ᵃ, to each of which a chain 38 is connected at one end, and to which I shall hereinafter again refer. Below the rectangular frame G, and underneath the seed box K, and slightly to the rear thereof, there is located a further shaft 39, Figs. 1, 6, and 7, journaled in bearings 40, fastened to the under side of the frame members 22, 22ᵃ, said shaft carrying at both of its ends double arms M, Mᵃ, the lower members 41 of which connect with rearwardly projecting bars 42, 42ᵃ, upon which there are loops 43, to which the lower ends of chains 38, already mentioned, are attached.

At the outer end of the shaft 36 there is secured a hand-lever N, which by the usual dog engages a notched quadrant 44, to retain the auxiliary frame Lᵃ at any elevation within its compass, said bars 42, 42ᵃ, having elongated apertures 45, through which the frame Lᵃ passes. In the auxiliary frame L as well as in the auxiliary frame Lᵃ there are cross bars 46, which are centrally punctured at 47, to receive, in frame L, bolts 48, wherewith engage the lower ends of the upper members 49, of the double arms M, Mᵃ. Upon each of these upper members 49 there is a loop 50, wherewith engage the lower ends of chains 51, the upper ends whereof connect with segmental arms 52, fastened to the outer ends of a shaft 53, journaled in bearings 54, located upon the upper surfaces of the side members 22, 22ᵃ, and having at one end a hand lever P, engaging a notched quadrant 55, similar to the hand lever N and the quadrant 44 already described.

To the underside of the seed box K there are secured a series of flexible seed dropper tubes R, which enter, with their lower ends, the upper ends of, preferably metallic, dropper pipes Rᵃ. These latter pipes are each secured in a pivoted pipe-holder I, each of which comprises two spaced bars 56, 56ᵃ, upwardly curved at their forward ends and pivotally connected to a pivoting member 57, having a shank 58, passing through the space between the upper and lower bars of the forward member 71, 72, Figs. 9, and 10, of the auxiliary frame L, and having a tightening nut 59, by means of which the pivotal member 57 is movably fixed to said forward member of frame L. These two bars 56, 56ᵃ, have each a downwardly projecting member or lug 60, wherein is pivotally mounted a presser wheel S. In the rear of these lugs 60, the bars 56, 56ᵃ turn upwardly and then horizontally, and they terminate in a single bar 56ᵇ, which passes through a downwardly pending loop 61, secured to the rear member 72, 73, of the auxiliary frame Lᵃ.

In order to strengthen the lower ends of the dropper pipes Rᵃ, each of these pipes has a brace rod 62, connecting the lower end of said pipe with the side member 56ᵃ of the pipe and presser wheel holder I. At the sides of each of these dropper pipes Rᵃ, there is located a knife holder T, comprising each, two upwardly curved side members 63, 63ᵃ, pivoted to a pivotal member 64, similar in construction to the pivotal member 57 of the pipe and presser wheel holders I, and secured to the forward member 71, 72, of the forward auxiliary frame L, in close proximity to said dropper pipe and presser-wheel holders. In these knife holders there are oblong slots wherein are fastened, preferably by set screws 65, the knives U, of usual construction. The two side members 63, 63ᵃ, of the knife holder U terminate in a single bar 66, which bar passes through a loop 67, fastened to the forward member 71 72 of the rear auxiliary frame Lᵃ.

I have heretofore described the rearwardly extending bars 42, 42ᵃ. These bars connect with a steering device V, comprising a treadle 68, pivoted in the central compound bar E near the rear end thereof, said treadle 68 having below said bar E a bell crank X, one arm, 69 of which connects with the bar 42ᵃ by a chain 70, while the other arm 69ᵃ, connects with the bar 42 by a chain 70ᵃ, the object of which will hereinafter more fully appear.

The machine thus far described is entirely adapted for dropping the seed and covering and pressing down the soil after the seed has been planted. To convert this machine into a cultivator, I remove the seed box K and all the dropper pipe holders I with their dropper pipes Rᵃ and the presser wheels S, and place into the machine a second set of knife holders Y with their cultivator knives U′, Fig. 8, said knife holders and knives being duplicates of the knife holders T and knives U heretofore described, so that it will not be necessary to further describe the same, except to state that the knives U in the knife holders T will be properly arranged to suit the conditions of use of the machine as a cultivator.

The auxiliary frames L, L^a, are, as shown in Figs. 9 and 10, alike in construction, each comprising an upper forward bar 71, and a lower forward bar 72, constituting the forward member of the auxiliary frame, and a rear upper bar 73, and a rear lower bar 74, constituting the rear member of said auxiliary frame, the bars 71 and 72, and the bars 73 and 74 being spaced by end bars 75, 76, and cross bars 46, to provide the longitudinal slots or spaces 77 wherein the shanks of the pivotal members are disposed, and wherein these pivotal members may be moved laterally to accurately space the parts I and T therein.

In operation as a seeding machine, (the machine being forwardly moved by the draft animals which are guided by the operator seated upon the seat F) the operator places his feet upon the treadle 68 of the steering device V, the proper marker (not shown) having been dropped to mark the required line for properly dropping the seed. And in order that subsequent lines be parallel to the first-marked line, the operator guides the auxiliary frame L^a, and through it the dropper pipes and other parts connected with the seeding mechanism thus: Moving the right hand part 68^a of the treadle forwardly, the arm 69 of the bell crank X will pull the chain 70, and with it, pull the bar 42^a laterally, or to the right of the machine looking to the front thereof. This bar is pivoted to the lower member 41 of the double arm M^a at 79, Figs. 1, and 3, and to the auxiliary frame L by the bolt 48, passing through the end of the upper member 49 of said double arm M^a, thereby pulling all the dropper pipes and the knives to the right owing to their being connected with the auxiliary frame by the loops thereon. An opposite movement of the treadle V causes the frame L^a to move in the opposite direction by the arm 69 pulling the chain 70^a and thereby pulling the rod 42 toward the left of the machine. In this manner the operator is enabled to accurately follow the line marked by the marker, or the rows of plants, and compensate for any irregularity in the forward movement of the machine caused by the swerving from a straight line, of the draft animals when propelling the machine.

In order that the dropper pipes may enter the soil the required depth, and to elevate the same sufficiently to pass to and from the field or in turning, the operator manipulates the hand lever N. Thus pushing the same forward causes the auxiliary frame L^a to be lowered and with it the dropper pipes, the presser wheels and the knives, while a contrary movement of the hand lever N raises the auxiliary frame L^a accordingly. But in order that the lower ends of the dropper pipes may maintain proper relation with the presser wheels S, the forward auxiliary frame L is also capable of being raised and lowered by the hand lever P and the chains 51 acting upon the upper members 49 of the double arms M, M^a, but this auxiliary frame L is prevented from lateral movement by the bolts 48 passing through the members 46 in said frame L.

Having thus fully described this invention, I claim as new and desire to secure to me by Letters Patent of the United States—

1. A combined seeding and cultivating machine, comprising, in combination, a main frame mounted on wheels, two subframes located transversely below said main frame, a shaft below said main frame, double arms on each end of said shaft, the upper members of said double arms being connected to the forward one of said subframes, means adapted to suspend said upper members of the double arms from said main frame, rods connected at one end to the lower members of said double arms, said rods projecting rearwardly, said rods being pivotally connected to one of said subframes, a treadle on said main frame, said treadle being connected with said rearwardly projecting rods, as set forth.

2. A combined seeding and cultivating machine, comprising, in combination, a main frame mounted on wheels, a forward steering wheel pivotally connected to said main frame, an auxiliary frame below said main frame and suspended therefrom, and means independent of the forward steering wheel adapted to move said auxiliary frame laterally, the latter means comprising rearwardly projecting rods, a treadle on said main frame, a bell crank below said main frame and connected to said treadle, and flexible means connecting said bell crank with said rods.

3. In a machine of the kind described, a main frame mounted on wheels, a forward and a rear subframe suspended below said main frame, separate means constructed to raise and lower each subframe independently from the other, and means constructed to move said subframes laterally, said means for suspending said subframes comprising a shaft located beneath said main frame and journaled in bearings secured to said main frame, arms at each end of said shaft, the forward one of said subframes being connected to said arms, rearwardly-projecting rods connected to said arms, pivotal bolts connecting said rods to said rear subframe, a treadle mounted upon said main frame, means constructed to connect said treadle to the rear ends of said rods, said rear subframe being suspended from the main frame by members connecting said rear subframe to one of said means constructed to raise and lower said subframes, said subframes being constructed to receive ground-treating tools, as set forth.

In testimony that I claim the foregoing as my invention, I have hereunto set my hand in the presence of two subscribing witnesses.

HENRY CORDES.

Witnesses:
JESSE J. CROSSEVY,
J. M. KELLEY.

Copies of this patent may be obtained for five cents each, by addressing the "Commissioner of Patents, Washington, D. C."